No. 897,967. PATENTED SEPT. 8, 1908.
E. E. ERVIN.
SPINDLE PROTECTOR.
APPLICATION FILED FEB. 1, 1907.
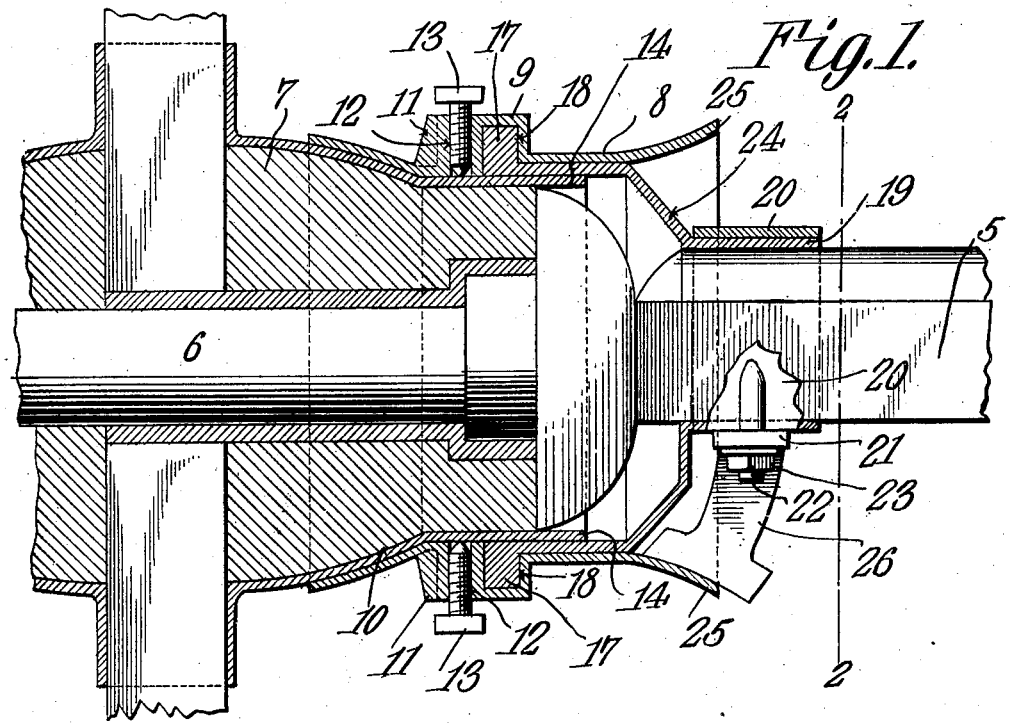
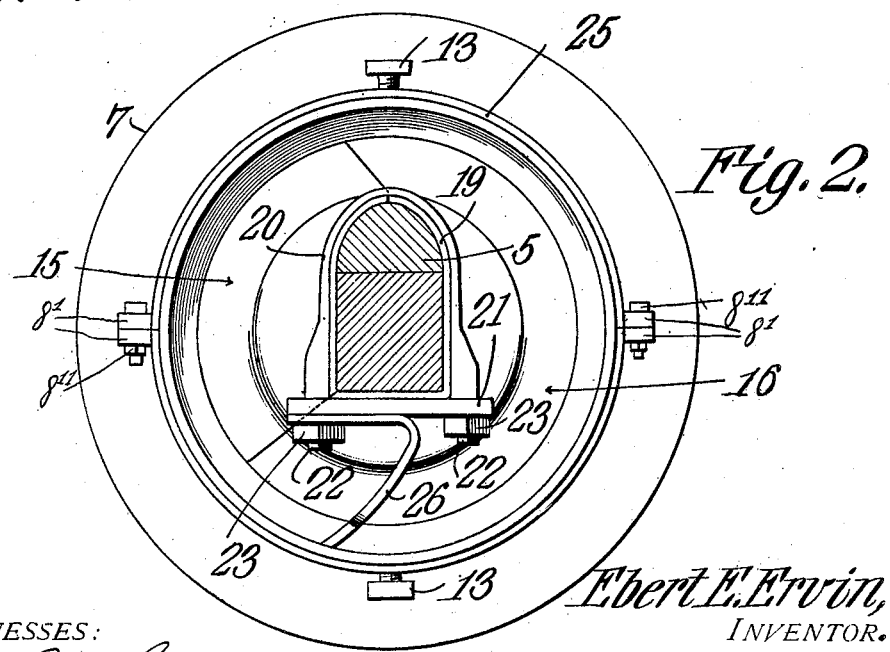
WITNESSES:
Ebert E. Ervin,
INVENTOR.
By C. A. Snow & Co.
ATTORNEYS

UNITED STATES PATENT OFFICE.

EBERT E. ERVIN, OF AUSTIN, INDIANA.

SPINDLE-PROTECTOR.

No. 897,967.  Specification of Letters Patent.  Patented Sept. 8, 1908.

Application filed February 1, 1907. Serial No. 355,280.

*To all whom it may concern:*

Be it known that I, EBERT E. ERVIN, a citizen of the United States, residing at Austin, in the county of Scott and State of Indiana, have invented a new and useful Spindle-Protector, of which the following is a specification.

This invention relates to dust guards or caps for vehicle wheels and has for its object to provide a comparatively simple and inexpensive device of this character capable of being readily attached to or detached from the hub of the wheel and by means of which dirt and other foreign matter are effectually prevented from entering the bearing and oil and other lubricant confined within the latter.

A further object of the invention is to provide a dust cap and guard the construction or relative disposition of the several parts of which is such that friction between the hub and cap is reduced to a minimum.

A further object is to provide a scraper for removing any accumulations of mud, dust and other foreign matter deposited on the rear end of the cap and further to form the dust cap or guard in sections thereby to permit the same to be readily positioned on or removed from the vehicle axle.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification: Fig. 1 is a longitudinal sectional view of a vehicle hub and axle provided with a dust guard or cap constructed in accordance with my invention. Fig. 2 is a transverse sectional view taken on the line 2—2 of Fig. 1.

Similar numerals of reference indicate corresponding parts in all of the figures of the drawings.

The improved device is principally designed for attachment to the hubs of vehicle wheels to prevent the entrance of dust and other foreign matter to the bearing of the latter and by way of illustration is shown applied to a vehicle wheel of the ordinary construction in which 5 designates the axle, 6 the spindle and 7 the hub mounted for rotation on the spindle.

The attachment consists of a tubular member or casing 8 adapted to embrace the hub 7 and provided with an intermediate annular circumferential bead or flange 9. The inner end of the casing 8 is curved to conform to the shape of the hub 7 and disposed between the curved end 10 of the hub and the intermediate rib 9 are integral reinforcing lugs 11 having threaded openings 12 formed therein for the reception of clamping screws 13, the latter being adapted to engage the metal housing 14 of the hub thereby to detachably secure the tubular member in position on said hub.

The cap or dust guard proper is preferably formed in a plurality of sections 15 and 16 which when united constitute a closure for the inner end of the hub and thus effectually prevent the entrance of dust and other foreign matter to the spindle. The sections 15 and 16 are provided with annular flanges 17 which engage the guide-way 18 formed by the rib 9, said sections being inclined towards the axle 5 and provided with extensions 19 which embrace the axle, as shown.

The dust guard or cap is secured in position on the axle 5 by means of a clip 20 which bears against the extensions 19 on the sections 15 and 16 and is provided with a transverse plate or bar 21 for the reception of the threaded ends 22 of the clip, there being suitable clamping nuts 23 engaging the threaded ends of the cap and bearing against the bar 21.

The inner end of the tubular member or sleeve 8 extends beyond the converging walls 24 of the cap sections 15 and 16 and is flared laterally, as indicated at 25 to drain off the water and thus prevent the same from working its way between the tubular member and cap of the spindle. The tubular member or sleeve is preferably formed in two sections each provided with laterally extending lugs 8' having perforations formed therein and adapted to register with each other for the reception of bolts or similar fastening devices 8'' whereby the casing may be readily positioned on or removed from the hub of the wheel.

As a means for removing any accumulation of mud, dirt and other foreign matter deposited on the interior walls of the tubular member 8 there is provided a spring pressed scraper 26 one end of which is interposed between the bar 21 and the adjacent clamping nut 23 while the opposite end thereof is bent downwardly and curved to conform to the flared end of the casing, so that as the wheel is rotated the scraper will keep the inner end of the tubular member free from dirt and the like.

Attention is called to the fact that the side walls of the scraper at the active end thereof are inclined to conform to the inclination of the cap sections 15 and 16 so that the scraper may be positioned in close proximity to the cap.

In attaching the device to the vehicle wheel the sections 15 and 16 of the cap are first placed in position on the axle with the scraper 26 bearing against the bar 21, after which the sections of the casing or tubular member 8 are placed on the adjacent end of the hub and fastened by the bolts 8″, the clamping screws 13 being subsequently adjusted so as to cause the casing to rotate with the hub.

In order to remove the hub it is merely necessary to release the screws 13 when the hub may be removed from the spindle leaving the dust guard or cap in position on the axle. The guard or cap not only prevents dust and other foreign matter from entering the bearing but also forms a closure for the inner end of the hub thereby preventing the grease, oil or other lubricant from escaping from the bearing and accumulating on the axle. The dust guard or cap may be attached to the vehicle during the course of construction or after completion and will effectually exclude muddy water and the like from the bearing without undue friction between the hub and cap.

From the foregoing description it will be seen that there is provided an extremely simple, inexpensive and efficient device admirably adapted for the attainment of the ends in view.

Having thus described the invention what is claimed is:

1. The combination with a vehicle axle and hub, of a cap secured to the axle and forming a closure for one end of the hub, and a sleeve surrounding the cap and bearing against the hub, said cap and sleeve being provided with interlocking parts.

2. The combination with a vehicle axle and hub, of a sectional cap secured to the axle and forming a closure for one end of the hub, and a sleeve surrounding the cap and detachably secured to the hub, said sleeve and cap being provided with interlocking parts.

3. The combination with a vehicle axle and hub, of a sleeve detachably secured to the hub and provided with a circumferential bead defining an annular guide way, and a cap provided with an annular flange adapted to enter the guide way, said cap being secured to the axle and forming a closure for the inner end of the hub.

4. The combination with a vehicle axle and hub, of a tubular member surrounding the hub and provided with a circumferential groove, a cap bearing against the axle and provided with an annular flange seated in said groove, a scraper bearing against the interior walls of the tubular member and a clip for locking the cap and scraper in position on the axle.

5. The combination with a vehicle axle and hub, of a tubular member surrounding the hub and having one end thereof flared, said tubular member being provided with an intermediate circumferential rib defining a groove, a cap having an annular flange adapted to enter the groove, a scraper bearing against the interior walls of the tubular member at the flared end thereof, and a common fastening means for securing the cap and scraper in position on the axle.

6. The combination with a vehicle axle and hub, of a tubular member surrounding the hub and provided with an annular groove, perforated lugs carried by the tubular member, a sectional cap having a terminal laterally extending flange engaging said groove, means for securing the cap in position on the axle, and clamping screws extending through the lugs and bearing against the hub for detachably securing the tubular member in position on said hub.

7. The combination with a vehicle axle and hub, of a tubular member detachably secured to the hub and mounted for rotation therewith, a cap secured to the axle, and a scraper carried by the axle and bearing against the interior walls of the tubular member, said cap and tubular member being provided with interlocking parts.

8. The combination with a vehicle axle and hub, of a tubular member detachably secured to and mounted for rotation with the hub, said tubular member having one end thereof flared and its intermediate portion provided with a circumferential rib defining a seating groove, a cap having a terminal laterally extending flange adapted to engage the walls of the seating groove, a clip for securing the cap in position on the axle, and a scraper depending from the clip and bearing against the flared end of the tubular member.

9. The combination with a vehicle axle and hub, of a tubular member secured to and mounted for rotation with the hub and having one end thereof flared laterally, a sectional cap disposed within the tubular member and provided with lateral extensions embracing the axle, a clip engaging the extensions for clamping the cap in position on the axle, and a scraper depending from the clip and bearing against the flared end of the tubular member.

10. The combination with a vehicle axle and hub, of a tubular member detachably secured to the hub and having its opposite ends flared and its intermediate portion provided with a circumferential groove, clamping screws extending through the walls of the tubular member and bearing against the hub, a cap disposed within the tubular member and provided with a terminal laterally extending flange seated within the groove, said cap being formed in sections and inclined towards the axle, one of the flared ends of the tubular member being extended beyond the inclined end of the cap, means for fastening the cap in position on the axle, and a scraper depending from the fastening means and bearing against the adjacent flared end of the tubular member.

In testimony that I claim the foregoing as my own, I have hereto affixed my signature in the presence of two witnesses.

EBERT E. ERVIN.

Witnesses:
JOSEPH S. MORGAN,
OSA LANGDON.